Dec. 7, 1937.     F. F. FIELD. JR     2,101,793
TRACTOR AND TRAILER
Filed June 29, 1936     2 Sheets-Sheet 1
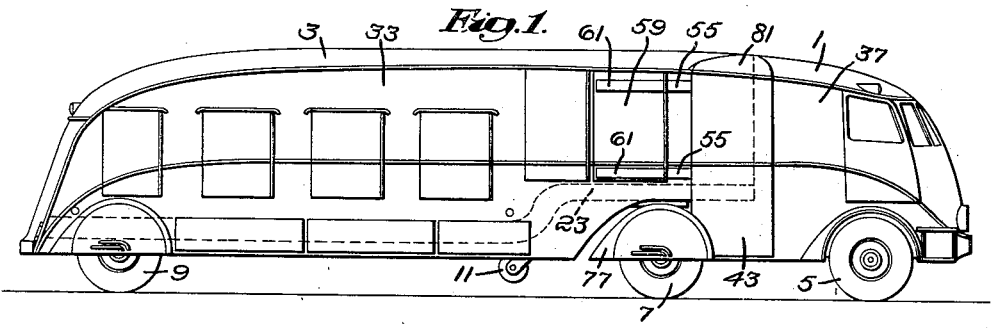
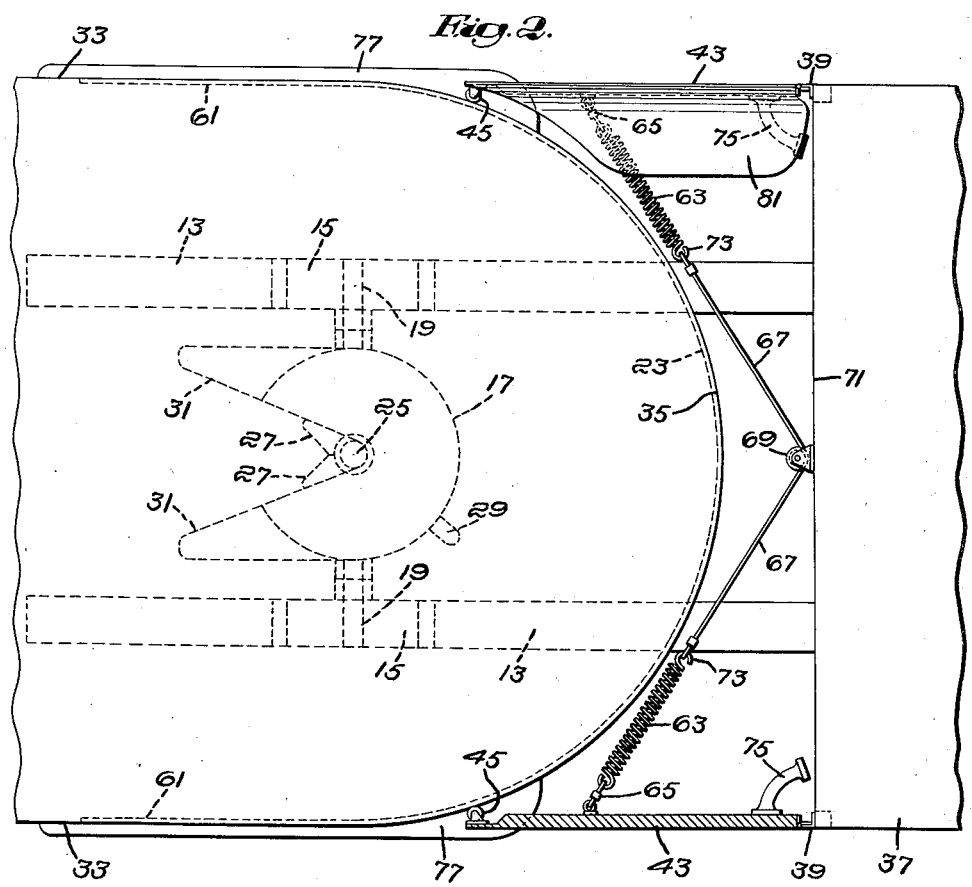
Inventor:
Fred F. Field, Jr.
Attys Dec. 7, 1937.  F. F. FIELD, JR  2,101,793
TRACTOR AND TRAILER
Filed June 29, 1936  2 Sheets-Sheet 2
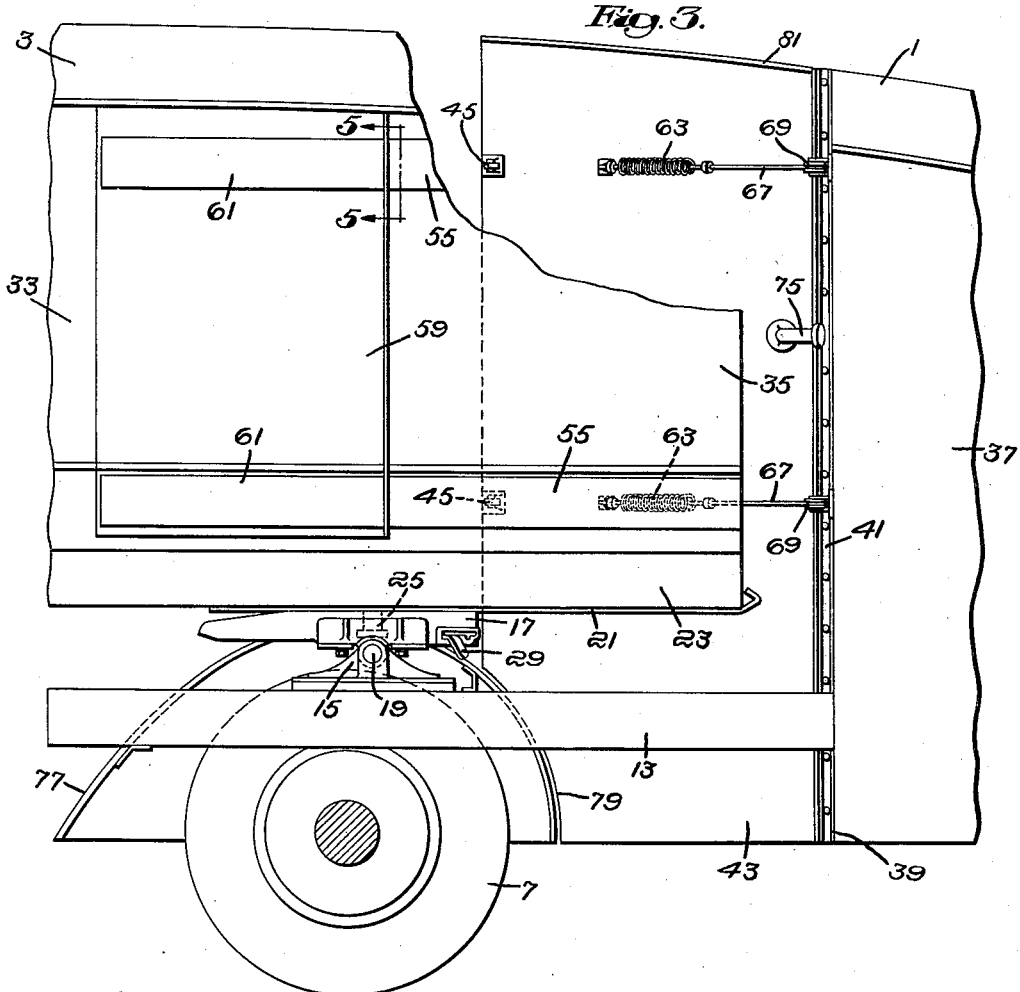
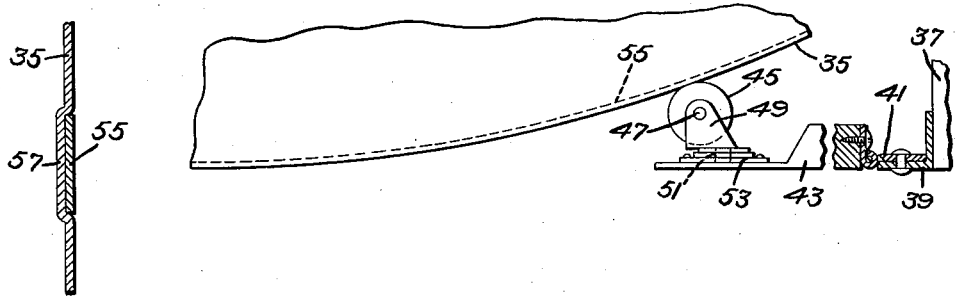
Inventor:
Fred F. Field, Jr.

Patented Dec. 7, 1937

2,101,793

UNITED STATES PATENT OFFICE 2,101,793

TRACTOR AND TRAILER

Fred F. Field, Jr., Brockton, Mass., assignor to Dutchland Farms, Inc., Brockton, Mass., a corporation of Massachusetts Application June 29, 1936, Serial No. 87,831

10 Claims. (Cl. 280—33.1)

My invention relates to vehicles, particularly but not exclusively those of the type comprising a tractor and a detachable trailer.

The invention has among its objects the provision of such a vehicle which throughout its length is "streamlined," particularly on the sides of the vehicle at the adjacent portions of the tractor and trailer bodies, yet permitting ready articulation of the tractor and trailer.

The invention will be best understood from the following description when read in the light of the accompanying drawings of an embodiment of the invention, the scope of which latter will be more particularly pointed out in the appended claims.

In the drawings:—

Fig. 1 is a side elevation of a road vehicle constructed according to the invention;

Fig. 2 is a plan, on an enlarged scale, with parts in section and parts omitted, of the portion of the vehicle adjacent the front end of the trailer and rear end of the tractor;

Fig. 3 is an elevation according to Fig. 2 with parts broken away and with the door at the right hand side of the vehicle and other parts omitted;

Fig. 4 is a plan, on an enlarged scale, with parts in section, of details of the door and associated parts; and Fig. 5 is a section on the line 5—5 of Fig. 3 on an enlarged scale with parts omitted.

The drawings illustrate a road vehicle of the "goods van" type comprising a tractor 1 and a trailer 3.

As shown, the tractor has front and rear wheels 5 and 7 respectively. The trailer has wheels 9 adjacent its rearward end and wheels 11 adjacent its forward end, the wheels 11, as will be understood by those skilled in the art, being normally raised out of contact with the road surface and lowered to contact with that surface only when the tractor and trailer are detached.

The details of the means for detachably connecting the tractor and trailer do not form part of the present invention, and therefore will be described only with such particularity as is necessary to enable an understanding of the present invention.

As illustrated, the horizontal frame members 13 of the tractor 1 carry bearing blocks 15 which support the lower member 17 of a so-called "fifth wheel," this member having aligned trunnions 19 severally rotatably supported in the blocks 15 so that the member 17 may swivel about the horizontal axis of the aligned trunnions. Resting upon the upper surface of the member 17 is a plate 21 fixedly carried by the chassis 23 of the trailer. Projecting downwardly from this plate in fixed relation thereto is a king pin 25 which is detachably engaged by complementary jaws 27 (Fig. 2) carried by the member 17, the engagement of the jaws with the king pin being such that the king pin may swivel relative to the member 17. When the trailer is to be detached from the tractor the jaws 27 are spread apart, to disengage the king pin, by mechanism (not shown) actuated by the manually operated swinging hand lever 29, the V-shaped opening between the inclined walls 31 at the rearward side of the member 17 permitting, when the king pin is thus disengaged, ready separation of the tractor from the trailer.

As illustrated, the trailer body has side walls 33, and this body preferably, although not necessarily, is closed by a rounded front wall 35 which preferably, although not necessarily, is a cylindrical surface concentric with the vertical axis of the king pin 25 and merges with the side walls 33 to present a smooth continuous surface.

As shown, the tractor body has side walls 37, at the rearward end of which and fixed thereto are vertical angle-irons 39. These angle-irons carry hinges 41 swingingly supporting doors or blinders 43, which doors form closures for the space between the rearward end of the tractor and forward end of the trailer at the sides of the vehicle, so as to form a vehicle having at that portion thereof side walls which are substantially smooth, unbroken surfaces.

As illustrated, the edges of the doors opposite the hinges carry rollers 45, the spindles 47 of which (Fig. 4) are mounted in brackets 49, these brackets having spindles 51 rotatably mounted in bases 53 fixedly secured to the doors. It will be observed that with this construction the mounting of each roller is that of a common form of caster employed for supporting the legs of furniture.

The rollers 45, when the trailer is swung relative to the tractor about the vertical axis of the king pin or about the horizontal axis of the aligned trunnions 19, roll over the surfaces of the front wall of the trailer body and the adjacent portions of its side walls, the "caster" mounting of the rollers readily permitting rolling thereof in any direction on these surfaces. This front wall of the trailer may comprise tracks 55, preferably formed of stainless steel or white metal alloy, or this front wall may comprise these tracks alone. When the tracks are employed they preferably, but not necessarily, are mounted flush with the adjacent portions of the walls of the body, being set into the recesses 51 formed on the exterior of the body, as best illustrated in Fig. 5. Preferably the tractor may be swung horizontally relative to the trailer through an angle of 90° at each side of the longitudinal axis of the trailer. In such case the track will extend entirely about the front end of the trailer and for an appropriate distance along the side walls of the trailer body. Where a door, such as the door 59, is positioned on the side walls of the trailer body adjacent its front end, the track may have sections 61 extending across this door.

For holding the rollers 45 of the door in contact with the walls of the body of the trailer suitable spring means are provided. As illustrated, this spring means comprises a pair of tension springs 63 each of which at one end is attached to the adjacent door by a link 65, the other ends of the springs being connected to each other by a cable 67 passing about a pulley 69 carried by the rear wall 71 of the tractor body. It will be noted by this construction that when the trailer is swung relative to the tractor about the vertical axis of the king pin the spring means is distorted only by the relative movement of one door relative to the other. Conveniently the inner ends of the springs 63 are formed as hooks 73 for engaging eyes (not shown) on the ends of the cables so that springs may be readily detached from the cables to permit the doors to be freely opened when desired. To limit the closing movement of the doors relative to the tractor body when the trailer is detached from the tractor, the doors carry suitable stops 75 adapted to engage with the rear wall of the tractor body, such a construction permitting the tractor readily to be backed into the trailer to cause engagement of the king pin without injury to the doors.

Preferably each door is provided with two rollers 45, one roller being positioned adjacent the upper end of the door and the other well below it so as to enable one or the other of the rollers to contact with the trailer body when the trailer is swung upward or downward about the horizontal axis of the aligned trunnions 19. Where a fender 77 is provided for the rear wheels 7 of the tractor the edge of the door opposite the hinge is cut away to conform to the forward surface of the fender in the normal position of parts as indicated at 79. As illustrated, the doors at their upper edges are provided with turned over portions 81 conforming to the outer edge portions of the roof of the tractor and trailer so as to present a substantially smooth continuous roof surface as viewed by an observer standing on the road surface.

It will be understood that within the scope of the appended claims wide deviations may be made from the form of the invention illustrated and described without departing from the spirit of the invention.

I claim:

1. A vehicle having, in combination, a tractor, a trailer connected to said tractor for relative swiveling in the plane of the road, said tractor and trailer having bodies, the rearward end of the tractor body being spaced from the forward end of the trailer body at the sides of the vehicle, a swinging door at each side of the vehicle hinged to one of said bodies for closing the space between them, and spring means connecting a door at one side of the body with a door at the opposite side of the body for yieldingly holding said doors in closed position.

2. A vehicle having, in combination, a tractor, a trailer detachably connected to said tractor for relative swiveling in the plane of the road, said tractor and trailer having bodies, the rearward end of the tractor body being spaced from the forward end of the trailer body at the sides of the vehicle, a swinging door at each side of the vehicle hinged to one of said bodies for closing the space between them, spring means connecting a door at one side of the body with a door at the opposite side of the body for yieldingly holding said doors in closed position, and stop means for limiting the movement of said doors in closing direction when said tractor and trailer are detached.

3. A vehicle having, in combination, a tractor, a trailer connected to said tractor for relative swiveling in the plane of the road, said tractor and trailer having bodies, the rearward end of the tractor body being spaced from the forward end of the trailer body at the sides of the vehicle, a swinging door at each side of the vehicle hinged to one of said bodies for closing the space between them, and roller means on said doors contacting with the other body.

4. A vehicle having, in combination, a tractor, a trailer connected to said tractor for relative swiveling in the plane of the road, said tractor and trailer having bodies, the rearward end of the tractor body being spaced from the forward end of the trailer body at the sides of the vehicle, a swinging door at each side of the vehicle for closing the space between said bodies at that side, said doors being hinged to said tractor about a substantially vertical axis and carrying roller means adapted to contact with the walls of the body of said trailer, and spring means for yieldingly holding said doors in closed position.

5. A vehicle having, in combination, a tractor, a trailer connected to said tractor for relative swiveling in the plane of the road, said tractor and trailer having bodies, the rearward end of the tractor body being spaced from the forward end of the trailer body at the sides of the vehicle, said trailer body having outwardly convex wall portions at the front end thereof adjacent the side walls thereof and joining therewith, a swinging door at each side of the vehicle for closing the space between said bodies at that side, said doors being hinged to said tractor about a substantially vertical axis and carrying roller means adapted to contact with the walls of the body of said trailer, and spring means for yieldingly holding said doors in closed position.

6. A vehicle having, in combination, a tractor, a trailer connected to said tractor for relative swiveling in the plane of the road, said tractor and trailer having bodies, the rearward end of the tractor body being spaced from the forward end of the trailer body at the sides of the vehicle, said trailer body having a substantially outwardly convex front end wall substantially merging with the side walls thereof, a swinging door at each side of the vehicle for closing the space between said bodies at that side, said doors being hinged to said tractor about a substantially vertical axis and carrying roller means for contacting with the adjacent portions of the side and end walls of said trailer, and spring means for yieldingly holding said doors in closed position.

7. A vehicle having, in combination, a tractor, a trailer adapted to be detachably connected at the forward end portion thereof to the rearward end portion of said tractor for relative swiveling about vertical and horizontal axes, said tractor and trailer having bodies with side walls, a vertical door at each side of the vehicle bridging the space between the side walls of said tractor and trailer at that side of the vehicle, said doors and side walls when said tractor and trailer are in longitudinal axial alignment forming substantially smooth unbroken surfaces, the forward end of the body of said trailer having portions adjacent the side walls of said body which are at least approximately cylindrical surfaces concentric with the vertical axis of swiveling of said tractor relative to said trailer, said doors being hingedly connected to said tractor for swinging movement, rollers at the upper and lower portions of each door mounted thereon for bodily swiveling about substantially horizontal axes, said rollers adapted to roll on the walls of the body of the trailer, spring means connecting said doors with each other for holding said rollers in contact with the walls of said body, and stop means for limiting the movement of said doors toward said tractor when it and said trailer are detached.

8. A vehicle having, in combination, a unit constituting a tractor, a second unit constituting a trailer connected to said tractor for relative swiveling in the plane of the road, said tractor and trailer having bodies, the rearward end of the tractor body being spaced from the forward end of the trailer body at the sides of the vehicle, means comprising a swinging door movably mounted upon one of said units for closing the space between said bodies in all normal relative positions thereof, means urging said door into closed position, and a roller carried by said door adapted to roll on one of said bodies, said roller being mounted for rolling in any direction on the last mentioned body.

9. A vehicle having, in combination, a tractor, a trailer connected to said tractor for relative swiveling in the plane of the road, said tractor and trailer having bodies, the rearward end of the tractor body being spaced from the forward end of the trailer body at the sides of the vehicle, a swinging door at each side of the vehicle hinged to one of said bodies and cooperating with the other body for closing the space between them, each door and the adjacent sides of said bodies forming a substantially smooth unbroken surface when said tractor and trailer are in substantially longitudinal axial alignment, means urging said doors into closed position, and rollers carried by said doors adapted to roll on one of said bodies, said rollers being mounted for rolling in any direction on the last mentioned body.

10. A vehicle having, in combination, a tractor, a trailer connected to said tractor for relative swiveling in the plane of the road, said tractor and trailer having bodies, the rearward end of the tractor body being spaced from the forward end of the trailer body at the sides of the vehicle, means comprising a swinging door at each side of the vehicle hinged to one of said bodies and cooperating with the other body for closing the space between them in all their normal relative positions, spring means for yieldingly holding said doors in closed position, and rollers carried by said doors adapted to roll on one of said bodies, said rollers being mounted for rolling in any direction on the last mentioned body.

FRED F. FIELD, JR.